(12) United States Patent
Cipolla

(10) Patent No.: US 8,931,251 B1
(45) Date of Patent: Jan. 13, 2015

(54) CHAIN AND CHAIN LINKS

(71) Applicant: Steven A. Cipolla, Warwick, RI (US)

(72) Inventor: Steven A. Cipolla, Warwick, RI (US)

(73) Assignee: National Chain Company, Warwick, RI (US)

( * ) Notice: Subject to any disclaimer, the term of this patent is extended or adjusted under 35 U.S.C. 154(b) by 0 days.

(21) Appl. No.: 14/197,545

(22) Filed: Mar. 5, 2014

Related U.S. Application Data

(60) Provisional application No. 61/805,582, filed on Mar. 27, 2013.

(51) Int. Cl.
  *F16G 13/12* (2006.01)
  *B21L 15/00* (2006.01)
  *F16G 15/12* (2006.01)

(52) U.S. Cl.
  CPC .................................. *F16G 15/12* (2013.01)
  USPC ................. 59/78; 59/84; 59/35.1; 116/200

(58) Field of Classification Search
  CPC ....... F16G 13/12; F16G 13/14; B21L 11/005; B21L 13/00; A44C 5/107
  USPC .......................... 59/30, 35.1, 78, 84; 116/200
  See application file for complete search history.

(56) References Cited

U.S. PATENT DOCUMENTS

| 3,662,539 | A | * | 5/1972 | Florjancic | 59/80 |
| 4,354,344 | A | * | 10/1982 | Yagi | 59/35.1 |
| 5,193,480 | A | * | 3/1993 | Garrett | 116/200 |
| 6,532,766 | B1 | | 3/2003 | Chia et al. | |
| 6,557,376 | B2 | | 5/2003 | Pratt | |
| 7,036,339 | B1 | | 5/2006 | Chia et al. | |
| 7,409,763 | B2 | | 8/2008 | Pratt | |

FOREIGN PATENT DOCUMENTS

WO    2006/091418    8/2006

* cited by examiner

*Primary Examiner* — David B Jones
(74) *Attorney, Agent, or Firm* — Salter & Michaelson

(57) ABSTRACT

A metal chain construction that includes a series of interconnected links with each link constructed and arranged in an annular configuration having either a circular or oval cross-sectional area. The link has, on at least one side thereof, a substantially planar indicia surface that is recessed into the cross-sectional area. An indicia in the form of a discernible indicia message is formed on said recessed indicia surface such as by an engraving. The link is of a metal alloy and the link joint is formed of a metal alloy solder mix.

23 Claims, 4 Drawing Sheets

CHAIN AND CHAIN LINKS

RELATED CASES

Priority for this application is hereby claimed under 35 U.S.C. §119(e) to commonly owned and U.S. Provisional Patent Application No. 61/805,582 which was filed on Mar. 27, 2013 and which is incorporated by reference herein in its entirety.

FIELD OF THE INVENTION

The present invention relates in general to a chain and pertains particularly to individual links of the chain. More particularly, the invention relates to providing indicia that can be readily observed on the surface of the chain.

BACKGROUND OF THE INVENTION

Chains are provided in various sizes and configurations. However, generally speaking each of the links of a chain has a rounded configuration. It is thus difficult to provide any indicia directly on the link itself. Many times tags or the like are used for identification purposes but that is time consuming and requires separate steps and complications. Thus, in accordance with the present invention, it is an object to provide a chain in which the individual links include at least a portion of a flattened surface so that indicia can be disposed on that flat surface. This indicia can be provided in many different forms such as by a printing process on the relatively flat surface or by an engraving in the flat surface.

SUMMARY OF THE INVENTION

To accomplish the foregoing and other objects, features and advantages of the present invention there is provided a metal chain that is comprised of a series of interconnected links with each link constructed and arranged in an annular configuration having either a circular or oval cross-sectional area. The link has, on at least one side thereof, a substantially planar indicia surface that is recessed into the cross-sectional area. Means are provided for creating a discernible indicia message that is formed on said recessed indicia surface such as by an engraving. The link is of a metal alloy and each link joint is formed of a metal solder mix.

In accordance with other aspects of the present invention the recessed substantially planar indicia surface is planar in at least one direction; the recessed substantially planar indicia surface is planar in orthogonal directions; wherein the recessed substantially planar indicia surface is planar in one direction and arcuate in an orthogonal direction; a recessed indicia surface is provided on opposed sides of the link; the recessed indicia surface extends about a minor length circumference of the link; including spaced apart recessed indicia surfaces on the same side of the link; and wherein the space between the recessed indicia surfaces is un-recessed.

In still other aspects of the present invention the link is constructed of a metal alloy; the metal alloy is comprised of silver, copper, zinc, indium, germanium and silicon; and the metal alloy includes silver at (93.5%), copper at (4.5%), zinc at (1.25%), indium at (0.5%), germanium at (0.2%) and silicon at (0.05%).

In still a further aspect of the present invention each link is formed by a link joint; the link joint is formed by a solder joint mix of a metal alloy; the solder mix is comprised of silver, copper, zinc, indium and copper phosphorous; and the solder mix is comprised of silver at (72.5%), copper at (14.5%), zinc at (12%), indium at (0.5%) and copper phosphorous at (0.5%).

DESCRIPTION OF THE DRAWINGS

It should be understood that the drawings are provided for the purpose of illustration only and are not intended to define the limits of the disclosure. In the drawings depicting the present invention, all dimensions are to scale. The foregoing and other objects and advantages of the embodiments described herein will become apparent with reference to the following detailed description when taken in conjunction with the accompanying drawings in which.

DETAILED DESCRIPTION

Figure 1:
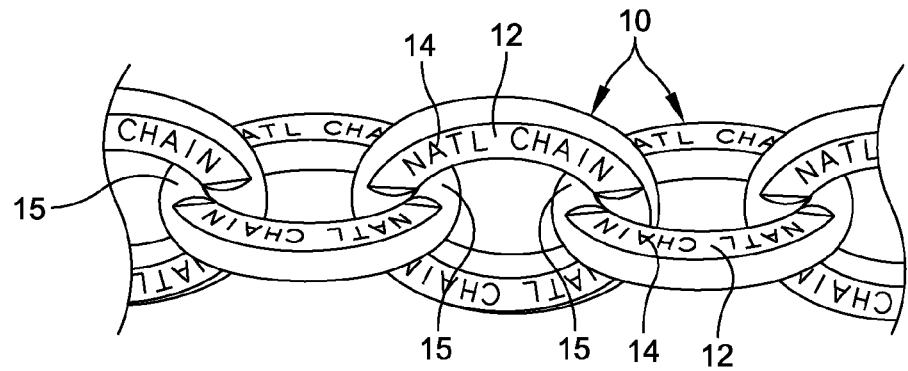
FIG. 1 is a perspective view of a first embodiment of the present invention.
Figure 2:
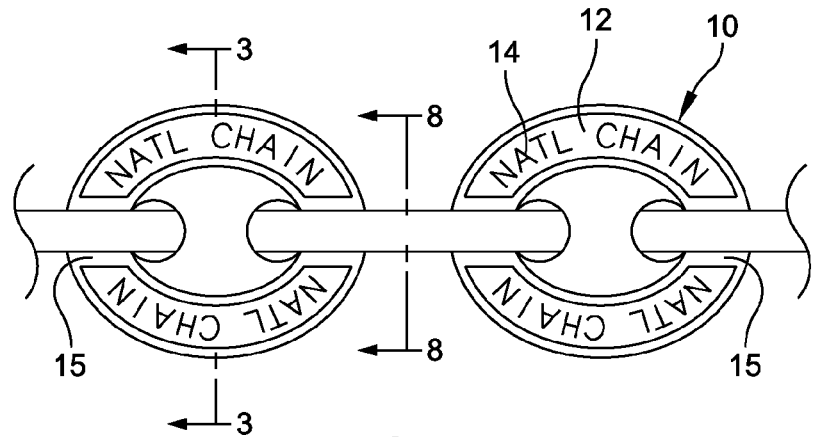
FIG. 2 is a front view of one of the links of the chain of FIG. 1.
Figure 3:
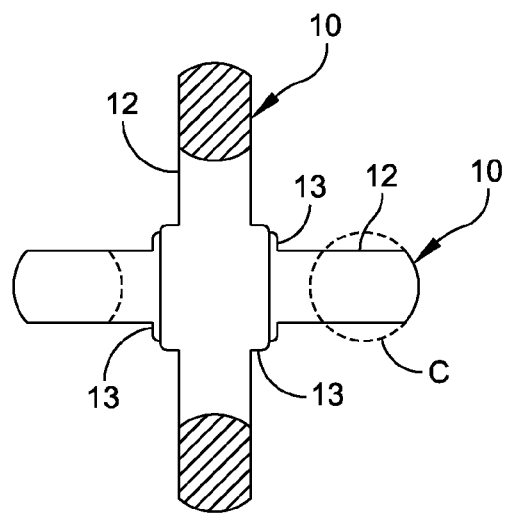
FIG. 3 is a cross-sectional view taken along line 3-3 of FIG. 2.
Figure 4:
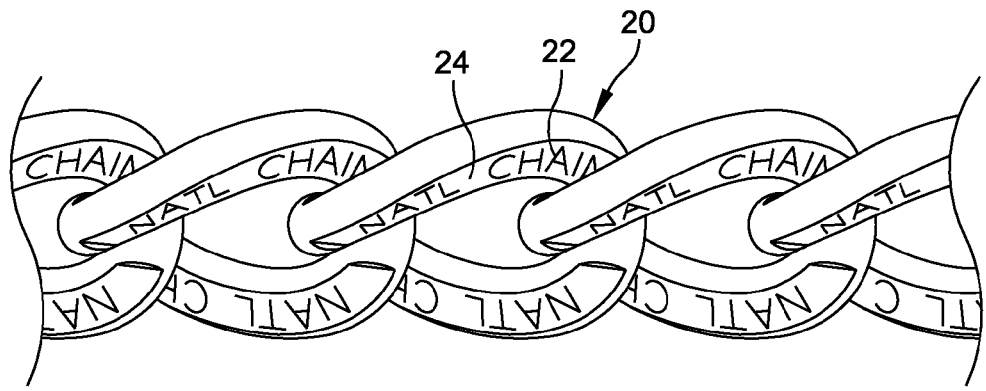
FIG. 4 is a perspective view of a second embodiment of the chain link of the present invention.
Figure 5:
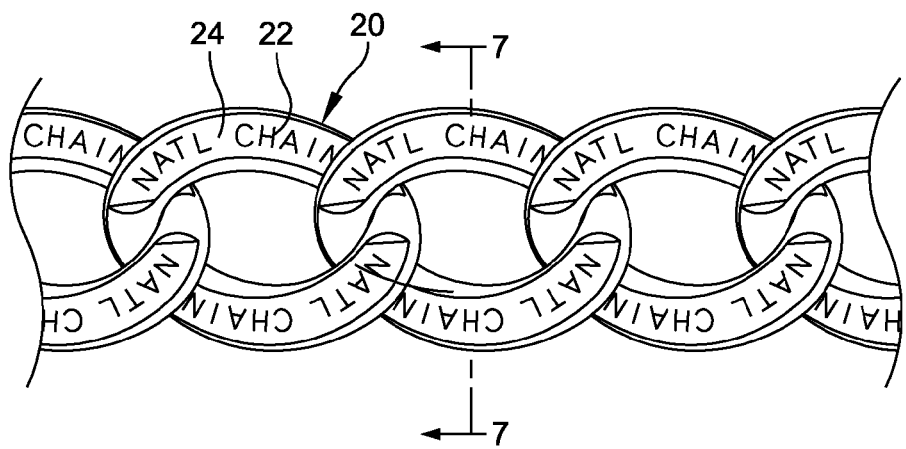
FIG. 5 is a front view of the link illustrated in FIG. 4.
Figure 6:
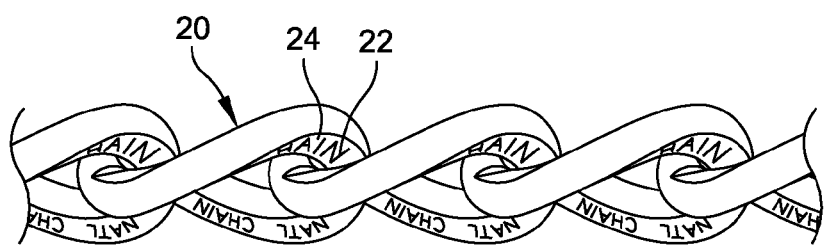
FIG. 6 is a top view showing multiple links and the relative placement therebetween.
Figure 7:
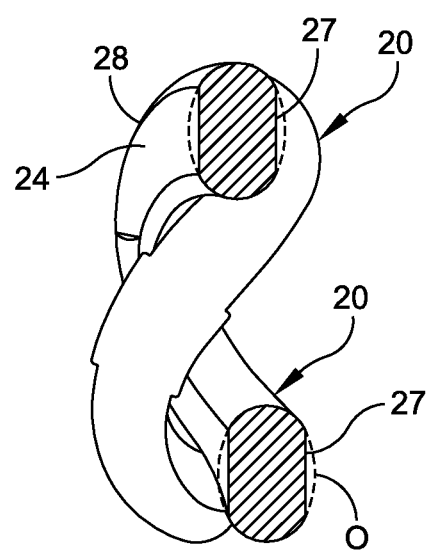
FIG. 7 is a cross sectional view taken along line 7-7 of FIG. 6.
Figure 8:
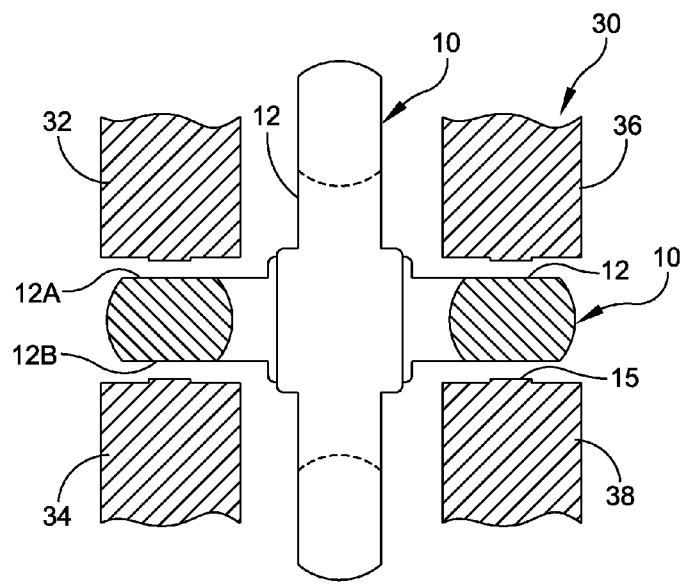
FIGS. 8-10 schematically represent steps taken in engraving the link.
Figures 9, 10:
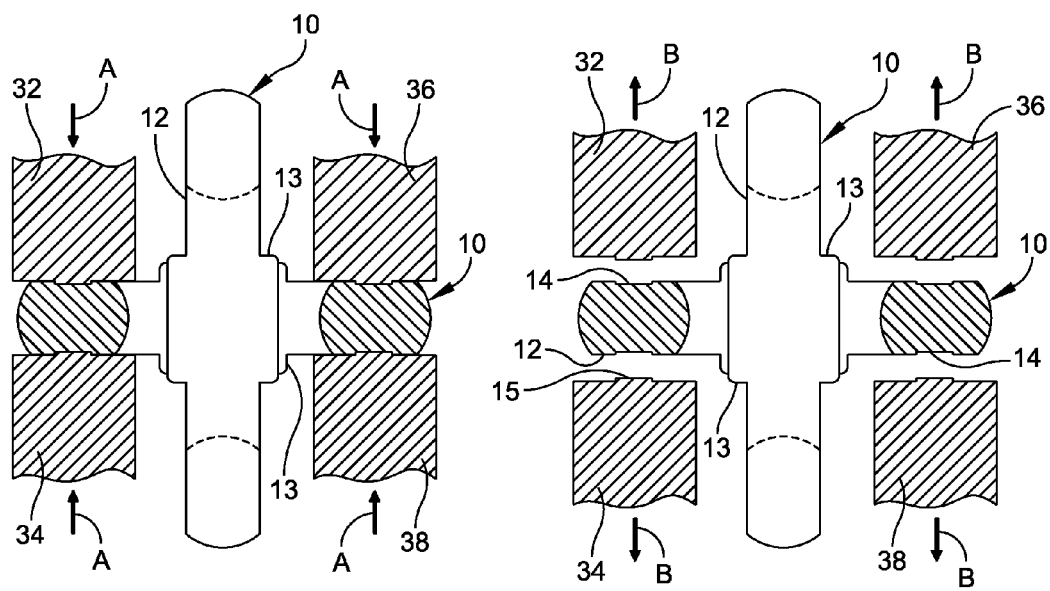

Reference is now made to the drawings and in particular, to two separate embodiments of the present invention. The first embodiment is illustrated in FIGS. 1-3 and a second embodiment is illustrated in FIGS. 4-7. FIGS. 8-10 schematically represent steps taken in engraving the link. In both of the different chain link embodiments there is provided a link of a series of interconnected links forming a chain. Each of these links may be constructed of a metal alloy material, as described in more detail hereinafter. As illustrated in the drawings, on preferably opposed sides of each link 10 there are provided opposed flat surfaces 12. These flat surfaces are of a sufficient width so that indicia can be provided such as illustrated at 14 in the first embodiment.

Each flat surface is recessed as shown forming a slight step as at 13 in FIG. 3. The chain is comprised of a series of interconnected links with each link constructed and arranged in an annular configuration having either a Circular© in FIG. 3) or oval (O in FIG. 7) cross-sectional area. Thus, each link has, on at least one side thereof, a substantially planar indicia surface 12 that is recessed into the cross-sectional area. Means are provided for creating a discernible indicia message that is formed on said recessed indicia surface such as by an engraving. Also, there may be like recessed flat surfaces on both side of the chain link.

In accordance with other aspects of the present invention the recessed substantially planar indicia surface 14, 24 is planar in at least one direction. The recessed substantially planar indicia surface 14 is illustrated as planar in orthogonal directions; actually disposed in a single plane. In the second embodiment the recessed substantially planar indicia surface 24 is planar in one direction and arcuate in an orthogonal direction. The recessed indicia surface extends about a minor length circumference of the link and preferably includes spaced apart recessed indicia surfaces on the same side of the link. The space 15 between the recessed indicia surfaces is un-recessed following the circular or oval cross-section.

The second embodiment of the present invention also illustrates one of the links 20 with a flat surface area surface at 24 and associated indicia at 24. The primary difference between these two embodiments is that the first embodiment, such as illustrated in FIGS. 1-3 has the surfaces extending in substantially a planar format. However, for the second embodiment illustrated in FIGS. 4-7, each of the surfaces 24 has a somewhat arcuate shape such as illustrated in the cross-sectional view of FIG. 7. This arcuate shape that is characterized by the slight twist of the links is also illustrated in the drawings. Thus, in this embodiment the indicia surface 24 is planar in one direction indicated at 27, while arcuate in the circumferential direction as indicated at 28 in FIG. 7.

Thus, in the first embodiment of the present invention, the surface 12 may be substantially planar while in the second embodiment of the present invention illustrated at 24 in the drawings, the surface may be planar in an orthogonal direction but may be slightly curved in the opposite direction so as to provide a sufficiently flat surface for receiving the indicia 22. The curvature is preferable slight so that the surface can be easily engraved.

The indicia at 14, 24 may be provided in a number of different ways such as by printing on the corresponding surface, by a preferred engraving technique, or by any other means for creating indicia on the particular surface.

The product is a chain link that has letters, symbols, numbers, pictures etc. integrated into the chain link itself. As part of the process fixtures may be used to hold the link, covered the material with lubricants, tested different surface textures and coatings and worked with different shapes. The inscription still could not to be seen well and faded in and out when using a shaped link. It was found that the best results occurred with a link having the recessed indicia surface in order to have a surface conducive to accepting the size and shape of the lettering. While this approach appeared to work, it was realized that part of the problem was the standard alloys used and the need to solve this problem before we could tell if flattening or recessing the link would work consistently and provide the desired engraving surface.

Tests were run to adjust the composition of the metal alloy. This included keeping an accurate track of the metals used, percentages, temperatures, cooling times, etc. After an exhausting amount of testing there was an adjusting of the specific metals used to make the alloy. This increased the amount of variables from 1 (percentage changes) to at least 5 (percentage changes), controlling such variables as casting temperature, casting speed and cooling temperature.

There was developed a computerized program to record and track these tests and narrow down the metals to test by finding out what the performance difference would be of the final alloy if a certain metal was added to it and how it would be affected by the other metals in the alloy and what percentages we should start with. We narrowed down the list of over fifty to fifteen. We then tested the different metals adding one to three metals at a time with a standard percentage of each and once we found a mix that we felt was the best we tested different percentages of each metal in that mix to create the best alloy that was able to be both flattened (recessed) and inscribed (engraved). The final mix consisted of silver (93.5%), copper (4.5%), zinc (1.25%), indium (0.5%), germanium (0.2%) and silicon (0.05%).

We now had an alloy that worked but this caused another problem of its own because the new alloy required a different blend of graphite for the casting crucible. Prior to this, the tests had been done in small test lots in molds. Again, we had to develop a crucible material for this alloy. We discovered a product that worked well with the alloy. We were now able to cast in quantity with the quality needed. As we started to draw down the new alloy, we found that it would crack and became very weak. Again, after weeks of testing, we found we had to redesign the Reduction Zone, Bearing and Back Relief of the draw die (this was contrary to normal draw die design), the reduction percentage between dies, adjust the annealing frequency, the annealing temperatures and cooling times (which had now become very critical) as well as the speed on our continuous belt annealing furnace and the time and temperature stages during heating and cooling in our quench annealer. This material acted different than any material in the industry. After the link was formed, we found that soldering the joint (the spot where the ends of the cut wire that forms the link meet) was almost impossible. We needed to develop a solder for this alloy that would be consistent with the preferred metal alloy of the link itself.

One of the variables that was dealt with was that it not only had to be compatible with the alloy but also able to be soldered on a continuous belt soldering furnace and compatible with a hydrogen and nitrogen gas mixture. Again, temperature, speed and cooling time affected the quality of the wire during the continuous belt soldering process. Over time numerous tests were conducted and a solder was discovered that worked but had to adjust the hydrogen/nitrogen percentages to hydrogen 62% and nitrogen 38% (in addition to temperature, speed and cooling time) as part of the final solution to make this successful. The final mix consisted of silver (72.5%), copper (14.5%), zinc (12%), indium (0.5%) and copper phosphorous (0.5%).

As described previously, the preferred way of providing indicia on the surface of the chain is by means of an engraving process. This engraving process is described in the sequential cross-sectional views of FIGS. 8-10. In FIGS. 8-10 the basic link construction is illustrated particularly in cross-section through the recess portion of the link as at 12. FIGS. 8-10 also illustrate the engraving tool at 30 which is comprised of separate respective tools 32, 34 and 36, 38. The tools 32 and 34 carry the indicia, which is to be printed on the surface 12 or 24. Because of the particular alloy that is selected as identified above, the engraving can be performed as a stamping action in which the letters or numbers of the indicia are formed, such as in opposed surfaces 12A and 12B illustrated in FIG. 8. FIG. 8 also illustrates on the opposite end of the link, the corresponding tools 36 and 38 used to engrave on that end of the link. Each tool 32, 34 and 36, 38 has an end print 15 (FIG. 8) that represents the indicia to be engraved.

FIG. 8 shows the tools 30 in their withdrawn position before the engraving takes place. FIG. 9 illustrates by arrows A the direction that the tools progress. For example, tools 32 and 34 move in the direction of arrows A to engrave in the respective surfaces 12A and 12B. The same action may also occur sequentially or concurrently with regard to the tools 36 and 38. Finally, the cross-sectional view of FIG. 10 illustrates the tools 30 moving in the direction of arrows B away from the link leaving the indicia at 22.

Having now described a limited number of embodiments of the present invention, it should now be apparent to those skilled in the art that numerous other embodiments and modifications thereof are contemplated as falling within the scope of the present invention.

What is claimed is:

1. A metal chain that is comprised of a series of interconnected links with each link constructed and arranged in an annular configuration having one of a circular and oval cross-sectional area, and having a substantially planar indicia surface that is recessed into the cross-sectional area, and means for creating a discernible indicia message that is formed on said recessed indicia surface, each said link having oppositely facing side surfaces and further including a substantially planar indicia surface recessed in each of the oppositely facing side surfaces.

2. The chain of claim 1 wherein the recessed substantially planar indicia surface is planar in at least one direction.

3. The chain of claim 2 wherein the recessed substantially planar indicia surface is planar in orthogonal directions.

4. The chain of claim 1 wherein each recessed indicia surface extends circumferentially.

5. The chain of claim 1 wherein the recessed indicia surface extends about a circumference of the link.

6. The chain of claim 5 including spaced apart recessed indicia surfaces on the same side of the link.

7. The chain of claim 6 wherein the space between the recessed indicia surfaces is un-recessed.

8. The chain of claim 1 wherein the link is constructed of a metal alloy.

9. The chain of claim 1 wherein the link is constructed of a metal alloy, and wherein the metal alloy consists of silver at (93.5%), copper at (4.5%), zinc at (1.25%), indium at (0.5%), germanium at (0.2%) and silicon at (0.05%).

10. The chain of claim 9 wherein the link joint is formed by a solder joint mix of a metal alloy consisting of silver at (72.5%), copper at (14.5%), zinc at (12%), indium at (0.5%) and copper phosphorous at (0.5%).

11. A metal chain that is comprised of a series of interconnected links with each link constructed and arranged in an annular configuration having one of a circular and oval cross-sectional area, and having, on at least one side thereof, a substantially planar indicia surface that is recessed into the cross-sectional area, and means for creating a discernible indicia message that is formed on said recessed indicia surface, and wherein the recessed substantially planar indicia surface is planar in one direction and arcuate in an orthogonal direction.

12. A metal chain that is comprised of a series of interconnected links with each link constructed and arranged in an annular configuration having one of a circular and oval cross-sectional area, and having, on at least one side thereof, a substantially planar indicia surface that is recessed into the cross-sectional area, and means for creating a discernible indicia message that is formed on said recessed indicia surface, wherein the link is constructed of a metal alloy, and wherein the metal alloy is comprised of silver, copper, zinc, indium, germanium and silicon.

13. The chain of claim 12 wherein the metal alloy includes silver at (93.5%), copper at (4.5%), zinc at (1.25%), indium at (0.5%), germanium at (0.2%) and silicon at (0.05%).

14. The chain of claim 13 wherein each link is formed by a link joint.

15. The chain of claim 14 wherein the link joint is formed by a solder joint mix of a metal alloy.

16. The chain of claim 15 wherein the solder mix is comprised of silver, copper, zinc, indium and copper phosphorous.

17. The chain of claim 16 wherein the solder mix is comprised of silver at (72.5%), copper at (14.5%), zinc at (12%), indium at (0.5%) and copper phosphorous at (0.5%).

18. A metal chain that is comprised of a series of interconnected links with each link constructed and arranged in an annular configuration having one of a circular and oval cross-sectional area, and having, on at least one side thereof, a substantially planar indicia surface that is recessed into the cross-sectional area, and means for creating a discernible indicia message that is formed on said recessed indicia surface, wherein each link is formed by a link joint formed by a solder joint mix of a metal alloy, and wherein the solder mix is comprised of silver, copper, zinc, indium and copper phosphorous.

19. The chain of claim 18 wherein the solder mix is comprised of silver at (72.5%), copper at (14.5%), zinc at (12%), indium at (0.5%) and copper phosphorous at (0.5%).

20. A metal chain that is comprised of a series of interconnected links with each link constructed and arranged in an annular configuration having one of a circular and oval cross-sectional area, and having, on at least one side thereof, a substantially planar indicia surface that is recessed into the cross-sectional area, and means for creating a discernible indicia message that is formed on said recessed indicia surface, wherein each link is formed by a solder joint mix of a metal alloy consisting of silver at (72.5%), copper at (14.5%), zinc at (12%), indium at (0.5%) and copper phosphorous at (0.5%).

21. A metal chain that is comprised of a series of interconnected links with each link constructed and arranged in a closed annular configuration having one of a circular and oval cross-sectional area, and having, on at least one side thereof, an indicia surface that is recessed into the cross-sectional area, and means for creating a discernible indicia message that is formed on said recessed indicia surface, and wherein each said link has oppositely facing side surfaces and further including an indicia surface recessed in each of the oppositely facing side surfaces.

22. The chain of claim 21 wherein each of the indicia surfaces is a substantially planar indicia surface and including at least first and second closed annular links with each link having a recessed substantially planar indicia surface, and a solder joint for closing each link.

23. The chain of claim 22 wherein the oppositely facing side surfaces each have at least two spaced apart substantially planar indicia surfaces recessed in each of the oppositely facing side surfaces.

* * * * *